(12) United States Patent
Gilling et al.

(10) Patent No.: US 11,677,855 B2
(45) Date of Patent: Jun. 13, 2023

(54) MANAGING APPLICATION PROGRAMMING INTERFACE (API) PATH TRENDS

(71) Applicant: Moesif, Inc., San Francisco, CA (US)

(72) Inventors: Derric Stephen Gilling, San Francisco, CA (US); Xingheng Timothy Wang, San Francisco, CA (US); Devendra Kumar Modium, San Francisco, CA (US)

(73) Assignee: Moesif, Inc., San Francisco, CA (US)

( * ) Notice: Subject to any disclaimer, the term of this patent is extended or adjusted under 35 U.S.C. 154(b) by 0 days.

(21) Appl. No.: 16/986,636

(22) Filed: Aug. 6, 2020

(65) Prior Publication Data

US 2021/0044672 A1 Feb. 11, 2021

Related U.S. Application Data

(60) Provisional application No. 62/883,379, filed on Aug. 6, 2019.

(51) Int. Cl.
| | |
|---|---|
| *H04L 67/60* | (2022.01) |
| *H04L 69/22* | (2022.01) |
| *H04L 67/306* | (2022.01) |
| *G06F 9/54* | (2006.01) |
| *H04L 67/133* | (2022.01) |
| *H04L 67/50* | (2022.01) |

(52) U.S. Cl.
CPC .............. *H04L 67/60* (2022.05); *G06F 9/541* (2013.01); *H04L 67/133* (2022.05); *H04L 67/306* (2013.01); *H04L 67/535* (2022.05); *H04L 69/22* (2013.01)

(58) Field of Classification Search
None
See application file for complete search history.

(56) References Cited

U.S. PATENT DOCUMENTS

| | | | |
|---|---|---|---|
| 9,667,704 B1* | 5/2017 | Sonawane | H04L 67/63 |
| 2011/0145842 A1* | 6/2011 | Tofighbakhsh | H04L 45/306 |
| | | | 719/328 |
| 2015/0128156 A1* | 5/2015 | Zhu | G06F 11/302 |
| | | | 719/328 |
| 2016/0057107 A1* | 2/2016 | Call | H04L 63/0236 |
| | | | 726/11 |
| 2017/0085447 A1* | 3/2017 | Chen | H04L 43/024 |

* cited by examiner

*Primary Examiner* — Tonia L Dollinger
*Assistant Examiner* — Ishrat Rashid

(57) ABSTRACT

Systems, methods, and software described herein manage and process application programming interface (API) statistics associated with an API provider. In one example, a monitoring service may determine API function sequence information associated with requests to an API provider. Based on the API sequence information, the monitoring service may identify API path trends and generate summaries based on the API path trends.

18 Claims, 8 Drawing Sheets

MANAGING APPLICATION PROGRAMMING INTERFACE (API) PATH TRENDS

RELATED APPLICATIONS

This application hereby claims the benefit of and priority to U.S. Provisional Patent Application No. 62/883,379, titled "MANAGING APPLICATION PROGRAMMING INTERFACE (API) PATH TRENDS," filed Aug. 6, 2019, and which is hereby incorporated by reference in its entirety.

BACKGROUND

Web service application programming interfaces (APIs) are defined interfaces that permit interactions to occur between the service associated with the APIs and users of the APIs. These APIs may permit users to obtain data from the service associated with the API, post data to the service associated with the API, or provide some other data operation with relation to the service associated with the API. For example, a web service API may permit an eCommerce seller to obtain shipping information, such as cost estimates, from a shipping service provider. Thus, rather than locally importing and updating the information from the shipping service provider, the eCommerce seller may obtain the required information from one or more databases maintained by the shipping service provider.

However, although APIs may provide efficient access to data between different services, difficulties can occur in determining how the various end users interact with and use the APIs. These difficulties are often compounded when an API is available to large quantities of users, each with different functional reasons for using the API.

OVERVIEW

Provided herein are systems, methods, and software to monitor and identify trends in application programming interface (API) function request paths. In one implementation, a monitoring service may obtain API request information associated with requests to an API provider, wherein the API request information indicates API functions used in the requests to the API provider. The monitoring service may further identify sequences of API requests based on the indicated API functions in the requests and identify one or more API path trends in the requests based on the identified sequences. Once the one or more API path trends are identified, the monitoring service further generates a summary of the one or more API path trends.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
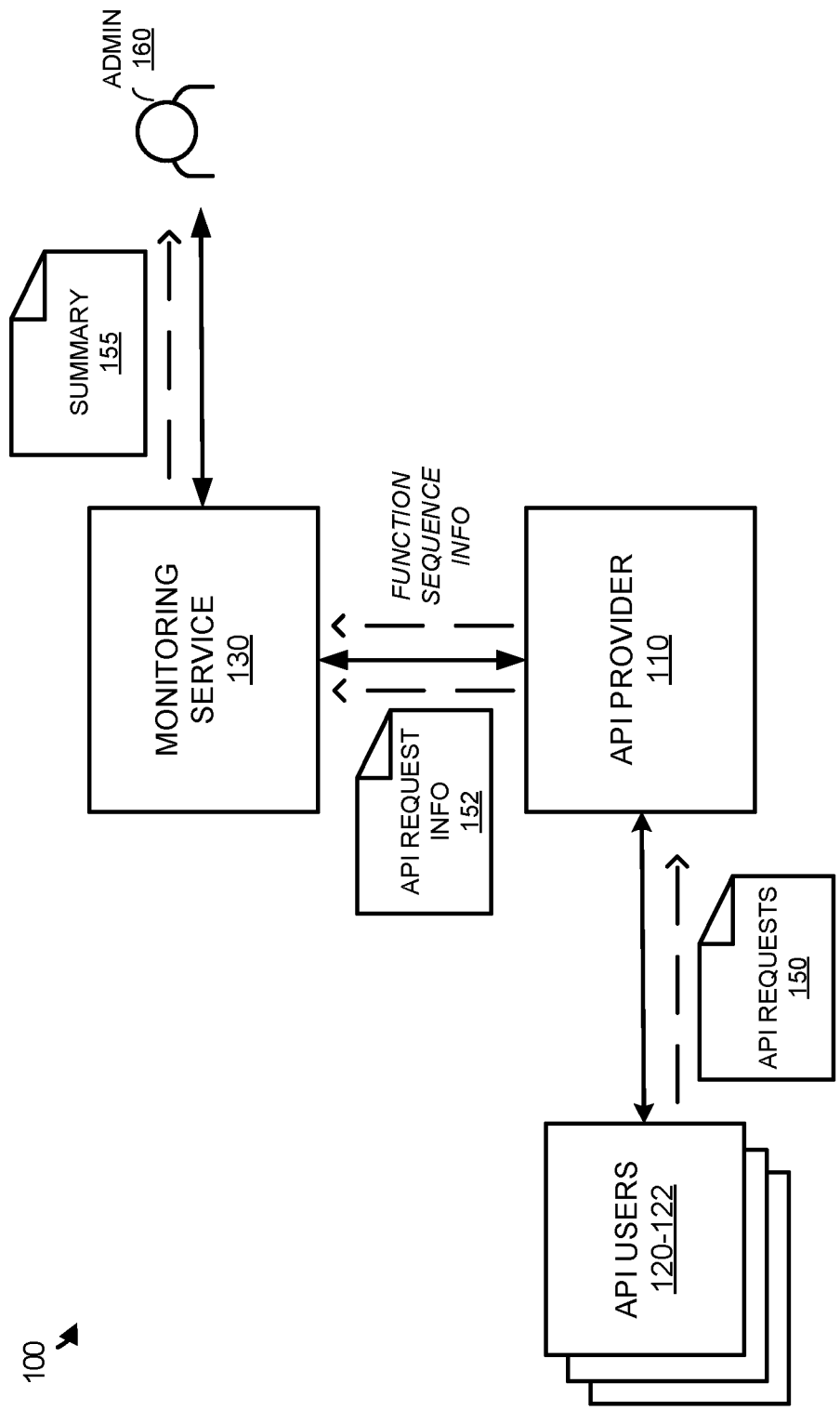
FIG. 1 illustrates a computing environment to manage application programming interface (API) statistics according to an implementation.

FIG. 1 illustrates a computing environment 100 to manage application programming interface (API) statistics according to an implementation. Computing environment 100 includes API users 120-122, API provider 110, monitoring service 130, and administrator 160. Computing environment 100 further includes API requests 150, API request information 152, and summary 155.

In operation, API users 120-122 generate API requests 150 over a network connection to API provider 110, wherein the requests may be used to provide various functionality for the API users. API requests 150 may correspond to requests to retrieve information from a service provided by API provider 110, post information to a service provided by API provider 110, modify data stored by a service provided by API provider 110, or some other operation associated with API provider 110. As an example, an API request of API requests 150 may request a social media post corresponding to a user of a social media service provided by API provider 110. API users 120-122 may correspond to individual users, service providers, such as other web services, application providers, or some other user of a web API. In some implementations, API users may correspond to companies that register subscriptions or licenses to interact with API provider 110.

As API requests 150 are obtained by API provider 110, API request information 152 is provided to or extracted by monitoring service 130. This API request information 152 includes at least header information for the API requests obtained from API users 120-122. In some implementations, monitoring service 130 may extract header portions of the packets from API users 120-122 and relevant API attributes for the request from the header. The API attributes may include a user identifier associated with the API request, the API function (API call identifier to a service, such as GET, POST, and the like) included in the request, or some other information related to the API request. The attributes may further include other header fields, uniform resource identifier (URI) routing information, status codes, or some other information associated with the API request. The attributes may also be extracted from the payload of the request in some examples.

In some implementations, API request information 152 may correspond to both the initial request from the API user and the response generated by API provider 110. The attributes from the response may include the amount of data communicated in the response, any error messages provided to the requesting API user, or some other information related to the response to the API user. Once the API attributes are extracted, the API attributes from the API requests may be used to generate various summaries of the API interactions with API provider 110.

In some implementations, as API request information 152 is obtained by monitoring service 130, monitoring service 130 may extract the function call used in the requests and determine API paths (or the sequence of API calls) used by API users 120-122. In some examples, the API request information from API provider 110 may indicate a session associated with each of the API requests. For example, API user 120 may generate a first request associated with a first API function. After generating the first request, API user 120 may generate a second request that corresponds to a second API function. These functions may comprise requests for data, requests to publish data, requests to remove data, or some other similar API function request. From the API request information, monitoring service 130 may determine sequences of requests to the API provider and identify trends in the requests. The trends may be used to indicate frequently used paths by API users 120-122, may be used to identify issues in the API, such as unused or nonfunctioning API functions, or identify some other trend in the sequences of API function requests to API provider 110.

In some implementations, the API request information may be used to determine sampling associated with the API requests. In particular, API request information 152 may represent a portion or subset of the requests to API provider 110. Monitoring service 130 may identify trends in the API request information and modify the sampling rate associated with the API request information. In some implementations, monitoring service 130 may identify trends associated with requests associated with each user of API users 120-122. The trends may include the quantity of requests to API provider 110, the types of requests to API provider 110, the sequence of requests to API provider 110, or some other trend. The trends may then be compared to expected trends associated with the user, wherein the expected trends may be based on the account associated with the user, previous requests from the user to API provider 110, or some other trend. If an unexpected trend is identified, monitoring service 130 may modify the sample rate associated with the user to identify additional information for the user. For example, a first rate may provide information for every tenth request to API provider 110, whereas a second rate may provide information for every fifth request to API provider 110.

In some examples, the changes to the sampling rate may be based on a classification associated with user, wherein the classification may be based on a variety of factors. These factors may include the length of time that the user has been using the API provider, the user type defined by the business, API provider account, or types of API commands used by the user, the API paths or quantity of requests from the user, or some other factor, including combinations thereof. For example, when a user starts using API provider 110, a profile may be stored at monitoring service 130, wherein at least a portion of the profile may be provided by the API user. Based on the information provided from the user, monitoring service 130 may identify the classification for the user and sample API requests in accordance with the classification.

Figure 2:
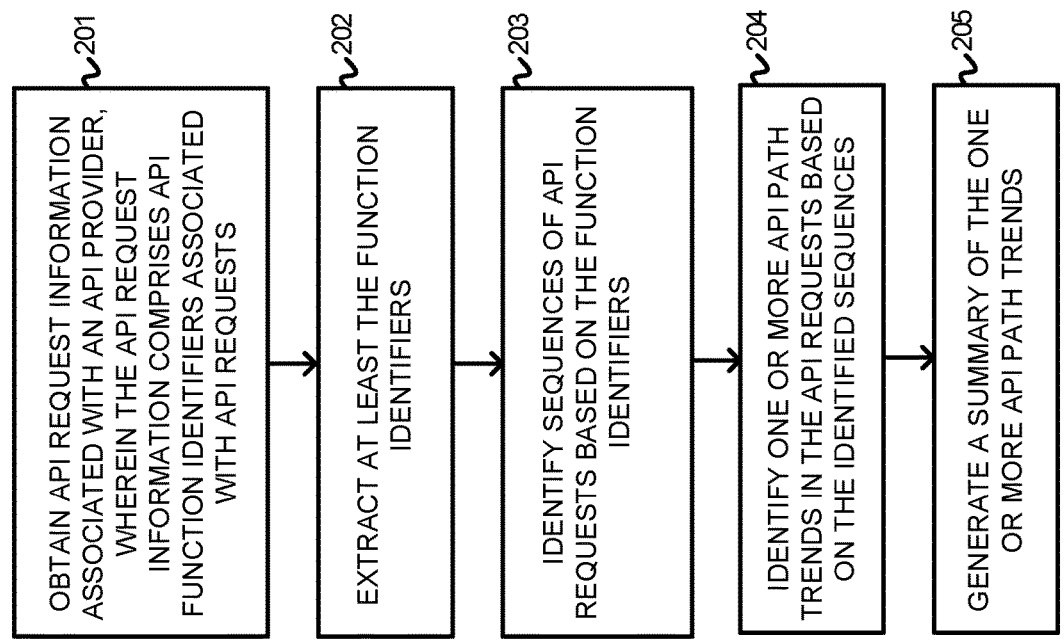
FIG. 2 illustrates an operation of monitoring and identifying trends in API paths according to an implementation.

FIG. 2 illustrates an operation 200 of monitoring and identifying trends in API paths according to an implementation. The processes of operation 200 are referenced parenthetically in the paragraphs that follow with reference to systems and elements of computing environment 100.

As depicted, monitoring service 130 may implement operation 200 to obtain (201) API request information associated with requests to an API provider, wherein the API request information comprises API function identifiers associated with the requests. In some implementations, API provider 110 may execute a process that identifies API requests 150 and provides at least a portion of the requests as API request information 152 to monitoring service 130. The API request information may identify the API user associated with each request, the function used in the request, the session or sequence associated with the request, a time stamp associated with the request or some other information. In some examples, API requests 150 may comprise packets and API request information 152 may comprise at least a portion of the headers associated with the packets. For instance, the process executing as part of API provider 110 may obtain API requests 150, extract the headers from the requests and provide the headers as API request information 152.

Once API request information 152 is obtained by monitoring service 130, monitoring service 130 may extract (202) at least function identifiers associated with the requests to API provider 110. These functions may be used to obtain data from repositories associated with API provider 110, write data to repositories associated with API provider 110, or implement some other operation in association with API provider 110. As the function identifiers are identified from API request information 152, monitoring service 130 may identify (203) sequences of API requests based on the identified functions. In at least one implementation, API request information 152 may provide information about the API request sessions to API provider 110. The session information may indicate the API user associated with the request, may identify a string of requests from the same user (e.g., a random, pseudo-random, token, or some other value associated with a string of requests), or may provide some other information to indicate a sequence of requests from API users 120-122. For example, an API user may initiate a first API request that is associated with a first API function and, subsequently, initiate a second API request that is associated with a second API function. Based on the API request information, monitoring service 130 may determine the sequence of requests from the API users.

In some implementations, monitoring service 130 may maintain one or more data structures that indicate the sequences of API functions used by API users 120-122. These data structures may indicate the sequences used by each API user of API users 120-122 individually, may indicate the sequences used by groups of API users of API users 120-122, or may indicate the sequences in some other similar manner. In some examples, the sequences may be associated with time stamps, such that sequences of API functions used during a first period may be compared against sequences of API functions used at another time period.

As the sequences of API functions are identified, operation 200 further identifies (204) one or more API path trends in the API requests based on the identified sequences. In one example, an API path trend may indicate the frequency at which various paths are used as part of API provider 110. In other examples, an API path trend may be determined based on comparing the API sequences or paths to supplementary information, wherein the supplementary information may comprise previously identified API sequences or paths, may comprise expected API paths defined by an administrator associated with API provider 110, or may comprise some other information. For example, API sequences or paths from a first period may be compared against API sequences or paths from another period. If one or more of the sequences differ from the first period to the second period, the one or more sequences may be identified as trends of interest for administrator 160.

Once the API path trends are identified, operation 200 may further generate (205) a summary of the one or more API path trends and provide the summary to an administrator, such as administrator 160. In some implementations, when a trend is identified, monitoring service 130 may generate a notification and provide the notification as the summary to the administrator. The notification may comprise a desktop popup via an application, an email, a text message, or some other notification. For example, if the API sequence information indicated that the API for a current period differed greatly from a previous period, monitoring service 130 may generate summary 155 to be provided to administrator 160 as summary 155.

In other implementations, rather than automatically generating a summary, monitoring service 130 may generate a summary in response to a request from administrator 160. The request may indicate a time period of interest, an initial API function for a sequence of functions, or some other attribute related to trends identified by monitoring service 130. As an example, administrator 160 may generate a request to identify trending API paths for a particular time period. In response to the request, monitoring service 130 may identify API path trends for the specified period and generate a visual representation of the trends. The visual representation for summary 155 may generate a heatmap of frequently used paths, a list of the most frequently used paths, a list of the most infrequently used paths, or some other representation of the trends derived from the function sequences provided in API request information 152.

In some examples, monitoring service 130 may be capable of identifying requests associated with each API user and may further identify each session associated with each of the end users. To identify the user and session associated with each of the requests, the API provider may allocate a session ID, an API key, an authorization token, or some other identifier to the API users. For example, when an API user initiates a first API request with the API provider or registers with the API provider, the API user may be allocated a user identifier and a session identifier. Accordingly, when API requests are generated, the API provider may identify the session identifier and user identifier from the request, wherein the identifying information may be provided as part of the header or payload for the request. As the identifiers are provided to the different users, a database may be maintained as part of the API provider and/or the monitoring service to indicate what user and session identifiers are associated with each API user.

In some examples, monitoring service 130 may monitor the sequence of all API functions used by the API users of API provider 110. In particular, while some API functions may be created to directly follow another API function, monitoring service 130 may determine when an API user selects a first function that typically corresponds to a first sequence, then selects a second function that typically corresponds to a second sequence. Monitoring service 130 may determine the rate at which the second function is selected after the first function, the rate at which the second function is selected after the first function in relation to other API users of the API provider, or some other information. As the API function request information is monitored, monitoring service 130 may generate summaries that can indicate information about the sequences of API function requests by one or more API users.

In some implementations, monitoring service 130 may monitor the conversion rate of API users who use the API provider. As an example, monitoring service 130 may identify when an API user uses a first API function or set of API functions. Monitoring service may then determine when the user returns and uses the same API function or set of functions. Once the reuse of the function or functions satisfy criteria, monitoring service 130 may determine that the API user has been converted or retained. The conversion rate information for the various API users may then be provided as part of a summary to an administrator associated with the API provider. The summary may indicate the percentage of API users that were retained or converted for the API provider, the total quantity of users that were converted, or some other information about the conversion of users of the API provider.

In some implementations, the summary that is provided by monitoring service 130 may occur periodically, may occur when trends satisfy one or more criteria, or may occur at some other interval. The summaries provided may comprise information about a single API user or may comprise information about a subset of API users. In some examples, the summary may promote particular trends, wherein the trends may represent the sequence of API function requests or may comprise some other trend related to the statistical use of API provider 110. Further, the summary may indicate possible solutions to identified trends, such as removing unused API functions, suggesting changes to the API sequences, or providing some other suggestion based on the identified trends.

In some examples, the summary may provide information about any number of trends or statistical information identified from the API request information, wherein the statistical information may comprise statistics about the initial requests and the responses to the requests. The trends displayed in the summary may comprise trends satisfying criteria (e.g., an API user using a sequence or sequences of functions that meet one or more criteria) or may be based on a user or administrator request for the summary. In particular, an administrator or user may indicate preferences for the summary, such as trends of interest, API users of interest, a time period of interest, or some other preference. Based on the preference, monitoring service 130 may generate a summary that includes a visual representation of statistical information that qualifies for the preferences. The visual representation may include bar graphs, tables, or some other visual representation that summarizes statistical information based on the preferences indicated by the user. For example, a user may request a graph of usage associated with an API function by the API users, wherein the graph may indicate the counts associated with the API function by each of the users.

In some examples, in addition to or in place of generating summaries, monitoring service 130 may be used to update configurations associated with API provider 110. These updates may include changing a sampling rate of API requests that are included in API request information 152, blocking requests from one or more API users, or providing some other modification. In one implementation, monitoring service 130 may monitor API request information 152, wherein the information may indicate trends associated with one or more of the API users. When a trend is identified, monitoring service 130 may modify a configuration associated with API provider 110 in accordance with the identified trend. In some implementations, the modification to API provider 110 may correspond to a modification to an API gateway. In particular, an API gateway may be used as an edge mechanism for the API provider that can be used to block or rate limit API requests, direct requests to the appropriate service, or provide some other operation. The API gateway may be used as a router to direct requests the various services provided by the API provider (e.g., different databases). These configuration changes to the API gateway may be used to directly communicate with a plugin that operates as part of the API gateway. Examples of the API gateway service may include Kong or NGINX that operate as a service for API provider 110.

In other implementations, rather than directing the changes to an API gateway, monitoring service 130 may make changes to a software development kit (SDK) that is implemented as part of the API service. The SDK may be used by an API provider to select and forward API request information to monitoring service 130, wherein the SDK may use sample rates and blocking preferences to select API requests for the API request information. For example, a configuration modification determined by monitoring service 130 may update the SDK for the API provider to increase or decrease the sampling rate associated with one or more API users. The sampling rate may be used to provide information about the initial requests from the API users and may further monitor the responses.

In some implementations, monitoring service 130 may be used to provide user behavioral API analytics that makes decisions based on the initial requests and/or the responses to the requests (together API request information). In particular, rather than merely sampling information for all API requests to the API provider, monitoring service 130 may be used to modify sampling rates for individual API users or groups of API users based on the API request information and/or information included in the API user profile (e.g., user type, industry, and the like). For example, monitoring service 130 may set a sample rate for a user based on whether the user is a "free" or a "paid" user of the API provider, which can be determined from the profile for the API user. In another example, the sample rate may be modified based on the error rate for requests to the API provider, unusual amounts of requests, or some other pattern trend identified in the statistics for the API user. This may also be extended to include multiple users, such as users in a particular industry, users within a defined user type, or some other group of users.

Figure 3:
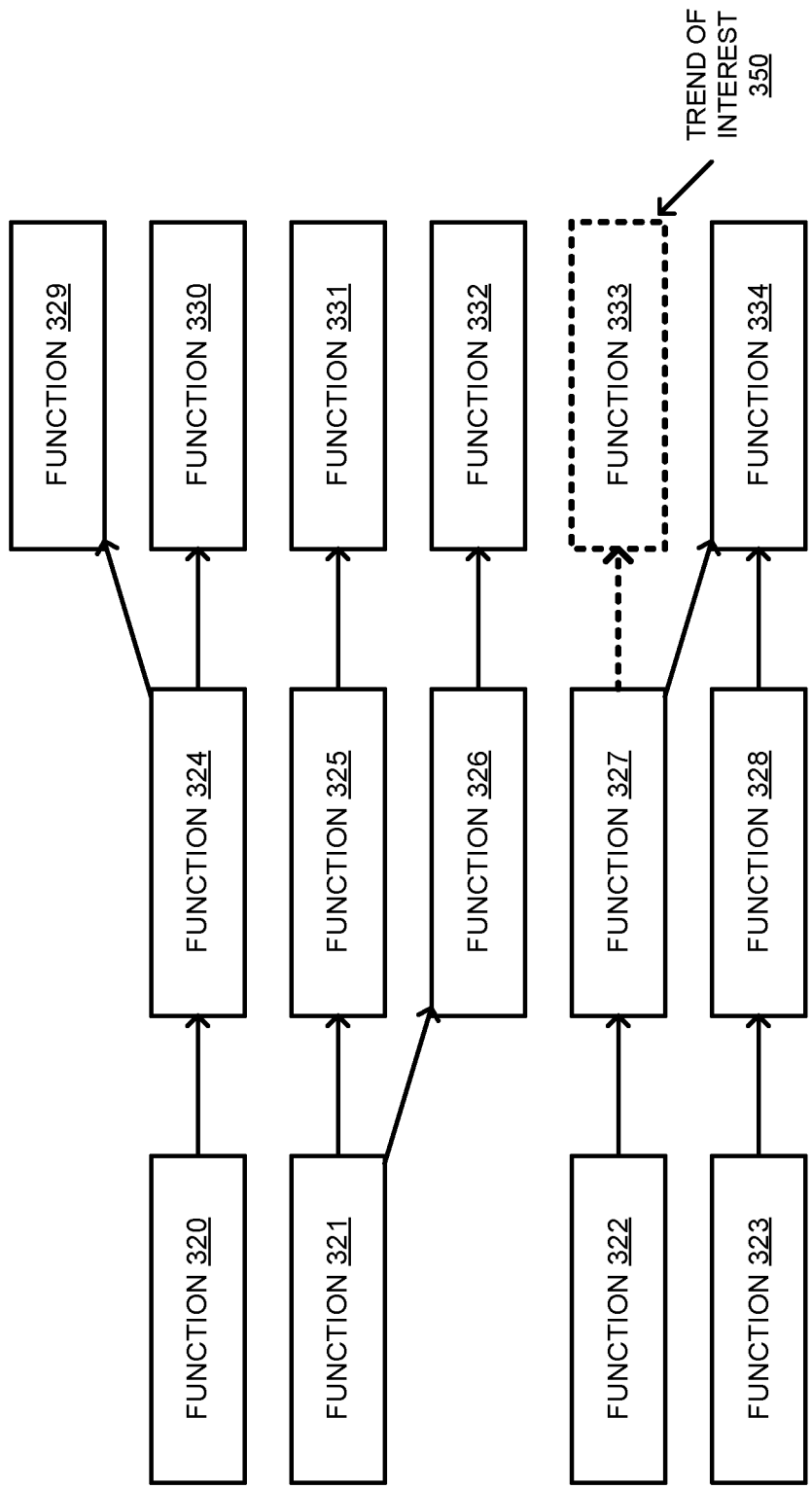
FIG. 3 illustrates an interface to demonstrate API path usage according to an implementation.

FIG. 3 illustrates an interface 300 to demonstrate API path usage according to an implementation. Interface 300 includes functions 320-334 that are coupled to one another using directional edges. Interface 300 further includes trend of interest 350 that is used to identify function 333 as a relevant function for an administrator associated with the API.

As described herein, a monitoring service may obtain API request information from an API provider that indicates various attributes of API requests to the API provider. These attributes may include an identifier of the API user associated with the request, a timestamp of the request, a session identifier to identify the sequence of API functions used, or some other information related to the API requests. As the information is obtained, monitoring service 130 may identify sequences of API requests based on the API information and determine API path trends from the identified sequences. In some implementations, the trends may be identified at the time of request by an administrator associated with the API provider, however, the trends may be identified automatically based on the sequences satisfying various trend criteria. In some implementations, the API trends may indicate API function usage as a function of time, may indicate differences in API function usage as a function of time, or may provide some other API trend.

Here, interface 300 includes a flow diagraph of API function sequences. In particular, as the API request information is obtained for the provider, the monitoring service may determine the sequences that each API is used and the frequency that each of the API functions is used as part of the sequences. In some implementations, the flow diagram may indicate a heatmap where sequences and functions that are frequently used are indicated differently than other sequences in functions. This may include displaying the functions and sequences that are more frequently higher in the flow diagram, using different coloring to display the frequently used functions and sequences, or providing some other indication regarding the frequently used functions and sequences. In some implementations, the monitoring service may indicate a rate or percentage that each API function was called in the sequence. For example, when function 321 is called, function 325 may be called sixty percent of the time following function 321 and function 326 may be called twenty percent of the time following function 321. Additionally, although not part of the sequence, the monitoring service may indicate when an API user or users transitions to a second sequence of API functions. For example, after using function 321, an API user may transition to function 322 twenty percent of the time. Advantageously, by providing this information to an administrator associated with the API provider, the administrator may identify trends or errors in the API that could cause the user to change from a first API functions sequence or path to a second API functions sequence or path.

Here in addition to displaying the various sequences of API functions, the monitoring service further identifies a trend that corresponds to a particular API function in the sequences of API functions. In particular, the monitoring service identifies function 333 as trend of interest 350. Trend of interest 350 may correspond to a function that is requested at a greater frequency than previous periods, a function that is requested at a lesser frequency than previous periods, a function that is not requested at all, or some other trend in the requests to the API provider. In some implementations, to identify trend of interest 350, the monitoring service may use various criteria to indicate when a function or functions correspond to an API trend. The criteria may include a rate of function requests, a total quantity of requests, or some other criteria. For example, during a first time period, function 333 may be requested at a first rate in association with the sequence of API functions from function 322 and 327. However, during a second period, function 333 may be requested at a second rate. The monitoring service may compare the first rate and second rate to determine whether criteria are satisfied, and when satisfied may identify the function as a trend of interest that can be provided as part of a summary to an administrator.

Although demonstrated as a flow between API functions in the example of FIG. 3, it should be understood that the monitoring service may be able to monitor any sequence of API functions by an end user. For example, the monitoring service may determine that an API user may select a first API function that is associated with a first sequence, but may then select a second API function that is associated with a second sequence. Advantageously, the monitoring service may be able to determine the frequency that the various API users complete a particular API sequence or whether API users frequently switch to another API sequence.

In some examples, the monitoring service may determine the percentage of API users that use a first API function and move to a second API function, where the second API function may correspond to a sequence of functions or a distinct function from the sequence. This information may be used to generate a summary that indicates frequent paths or flows for each of the API users as they interact with the API provider. In some implementations, the summary may indicate paths and usage percentages for an individual API user, however, it should be understood that the summary may indicate paths and usage percentages (rates) for multiple API users.

Figure 4:
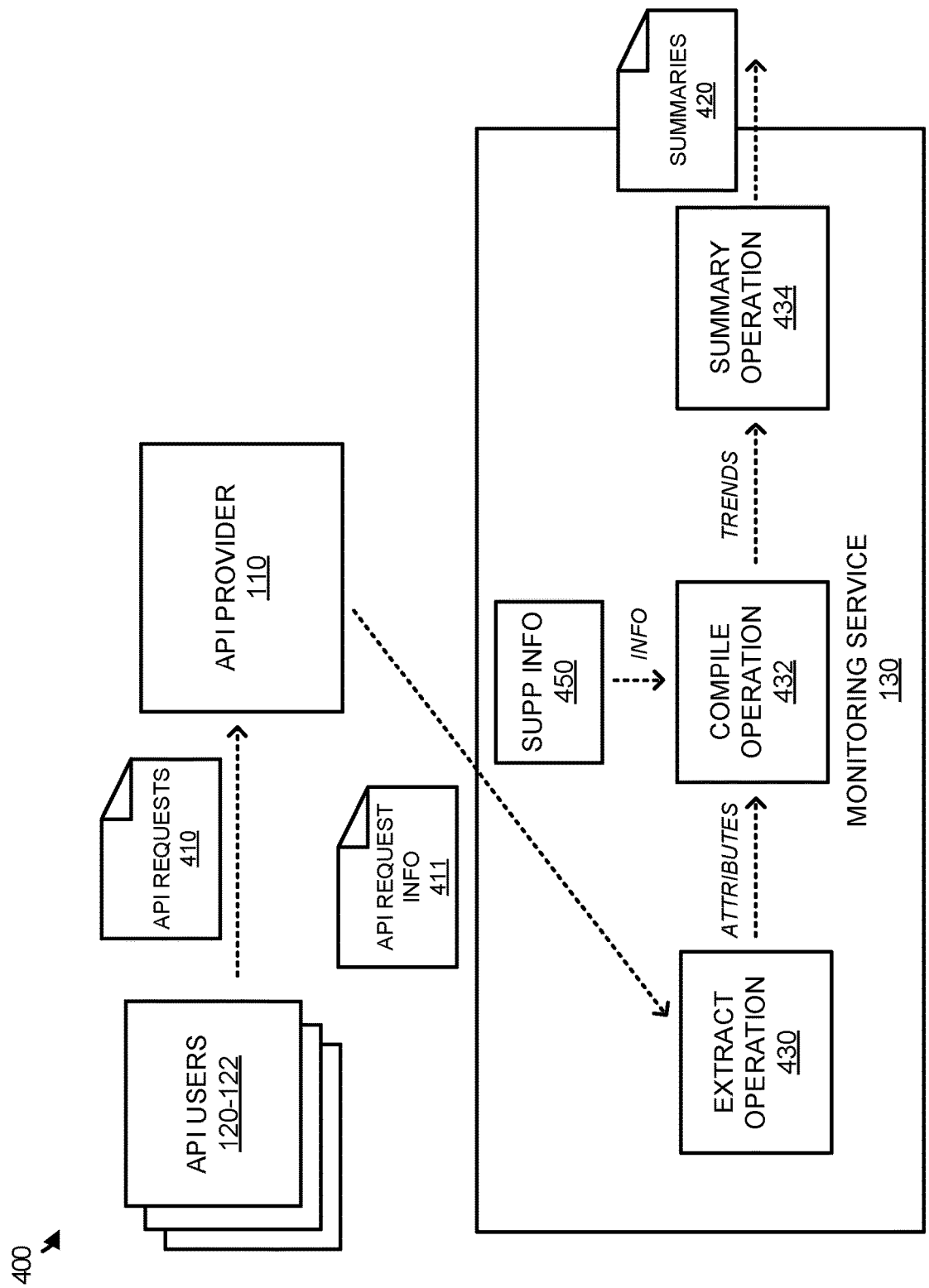
FIG. 4 illustrates an operational scenario of identifying a trend in API path usage according to an implementation.

FIG. 4 illustrates an operational scenario 400 of identifying a trend in API path usage according to an implementation. Operational scenario 400 includes elements from computing environment 100 of FIG. 1, including API users 120-122, API provider 110, and monitoring service 130. Operational scenario 400 further includes API requests 410, API request information 411, extract operation 430, compile operation 432, summary operation 434, summaries 420, and supplementary information 450.

In operation, API users 120-122 generate API requests 410 to be received by API provider 110. These requests may include various API functions to obtain, post, or replace data within one or more data repositories maintained by API provider 110. For example, an API request may be used to obtain shipping estimates for a postal service provider to a specific destination. As the API requests are obtained by API provider 110, API provider 110 may further identify and provide API request information 411 to monitoring service 130. The API request information may comprise at least header information derived from the requests to API provider 110, wherein the header information may indicate the API function, the API user associated with the request, a sequence identifier for when the API requests may include a sequence of requests, or some other information. The API request information may comprise the full API request packet, the header of the packet, or a portion of the packet that includes the desired attributes for monitoring service 130. In some implementations, API request information 411 may include information for all requests to API provider 110, however, it should be understood that information may be provided for a portion of the API requests to API provider 110. The API request information may be provided to monitoring service 130 periodically, during request down periods for API provider 110, or at some other interval. The API request information is representative of information for the initial request from the API users and may further represent information associated with the responses. The information from the responses may include the amount of data provided, the type of data provided, or some other information. For example, information about the amount of data provided in response to an API request may be used to identify one or more API users that are obtaining an unexpected amount of data or may be used to indicate the amount of data provided to an API user in relation to other API users.

Once API request information 411 is obtained by monitoring service 130, monitoring service 130 may perform extract operation 430 to extract the various attributes from the API request information. After extraction, the attributes are provided to compile operation 432, wherein compile operation 432 may be used to identify trends in the sequences of API functions requested by API users 120-122. In some implementations, compile operation 432 may determine trends based on the frequency that various sequences were requested by API users 120-122. In other implementations, compile operation 432 may compare sequences identified in API request information 411 to supplementary information 450. Supplementary information 450 may represent sequence information for previous API requests to API provider 110, may represent predicted sequence information provided by an administrator, or may represent some other supplementary information that can be compared to the sequences identified in API request information 411.

In some implementations, the API path trends may be determined by comparing sequences identified in a first period to sequences identified in a second period. This comparison may include comparing the frequency that each sequence was used, the API users associated with the sequences used, or some other comparison. For example, API user 120 may use a sequence of API functions at a first rate during a first period, but use the same sequence of API functions at a second rate during a second period. If the first rate and second rate differ by a threshold amount, then the sequence or portions of the sequence may be identified as an API trend of interest.

In some implementations, the API path trends may be determined by comparing the sequences identified from API request information 411 to sequences that are expected from API users 120-122. The predicted sequences may be based on historical API requests to API provider 110, may be based on administrator defined sequences, or may be based on some other predictive sequence information. When differences are identified that satisfy trend criteria (e.g., identifying an unknown sequence), a trend may be identified that corresponds to the sequence.

After the trends are identified for the API paths, summary operation 434 may generate summaries 420 that can be provided to one or more administrators associated with API provider 110. In some examples, the summaries may be generated based on requests from the administrators. In other examples, the summaries may be generated when trends are identified in the API request sequences. A summary may include a visual representation of the trend, wherein the visual representation may comprise a heatmap or frequency map corresponding to the various API sequences (further demonstrated in FIG. 3), may comprise a list of one or more API functions or sequence of functions that are of interest to the administrator, or may comprise some other information related to the trends, including combinations thereof.

In at least one example, when a trend is identified that corresponds to an API function path or sequence, summary operation 434 may generate a notification for an administrator that can include a popup notification, an email notification, a text message, or some other notification. The notification may identify the path of interest and may further identify statistics related to the path of interest. For example, if an API path or sequence is identified as not being used by API users 120-122, then the monitoring service may determine that a notification should be provided as a summary to an administrator associated with API provider 110. The notification may indicate the API path that is no longer in use, information about the statistics (if any) during prior periods, possible issues related to causing the lack of use, among other operations. In some examples, the summary that is provided to the administrator may indicate possible solutions to the issue, wherein the solutions may indicate changes to the version associated with the API, changes to the API users that are using the API, or some other similar change.

In some implementations, as the sequences and trends are identified from API request information 411, the sequences and trends may be stored in one or more data structures associated with supplementary information 450. As a result, when additional API request information is provided from API provider 110, the previously identified API path trends and sequences may be compared to the newly identified paths and sequences.

In some implementations, summaries 420 may include information about a variety of statistical information derived from API request information 411. The statistical information may include statistics about the initial requests, such as a quantity of requests from each API user, the types of requests from each API user, or some other initial request statistic. The statistical information may further include information about the responses from API provider 110, which may include the amount of data provided in the responses, errors in the responses, or some other information about the responses. A summary may be expressly requested for by an administrator or user or may be automatically generated based on a trend satisfying one or more criteria. For example, if data provided in response to requests by API user 120 exceeded a threshold, a summary may be generated that indicates the amount of data supplied to API user 120. Additionally, supplementary information may be provided that indicates the amount of data in relation to other API users, types of requests from the API user 120, or some other information. In some implementations, in addition to or in place of providing a summary, monitoring service 130 may interact with an API gateway for API provider 110 or SDKs to change sample rates for API request information 411, block requests from one or more API users, or provide some other modification to change sample rates or limit access to the API for one or more users.

Figure 5:
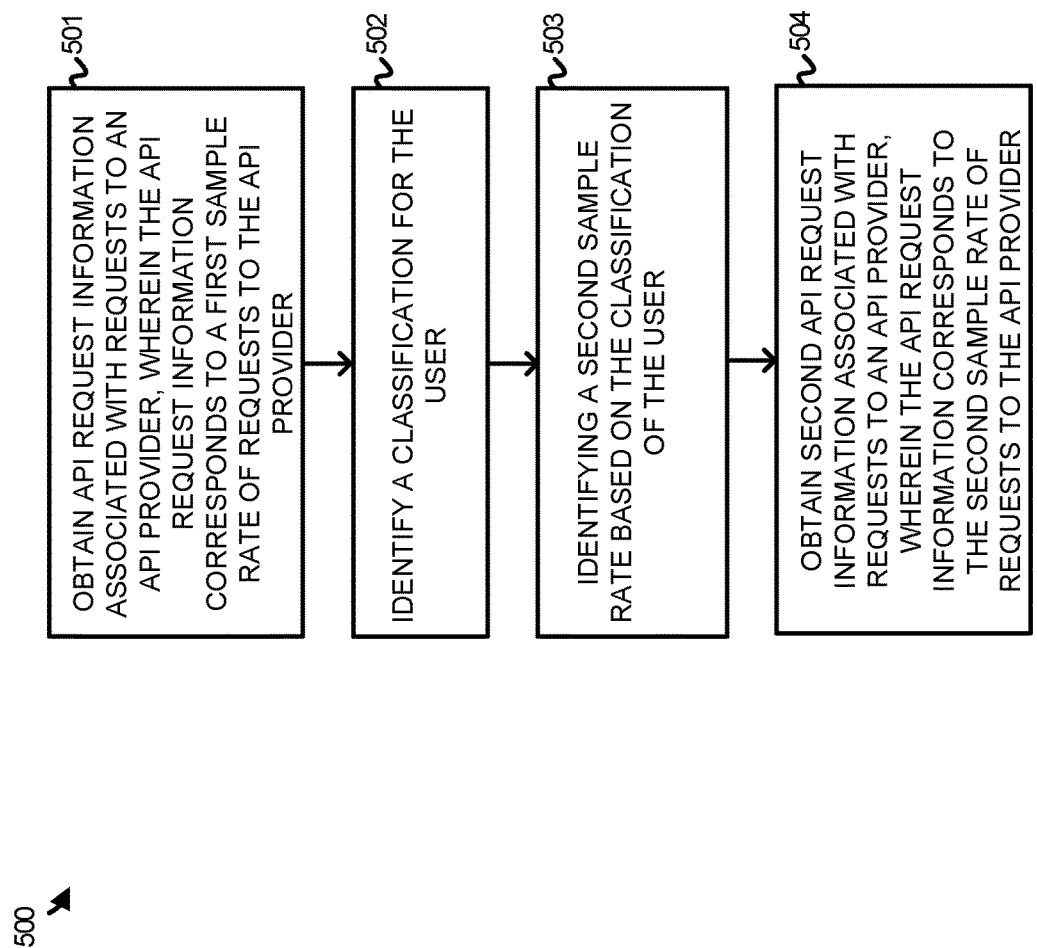
FIG. 5 illustrates an operation of a monitoring service to manage sampling rates associated with API users according to an implementation.

FIG. 5 illustrates an operation 500 of a monitoring service to manage sampling rates associated with API users according to an implementation. The steps of operation 500 are referenced parenthetically in the paragraphs that follow with reference to systems and elements of computing environment 100 of FIG. 1.

As depicted, operation 500 includes obtaining (501) API request information associated with requests to an API provider by an API user, wherein the API request information corresponds to a first sample rate of requests to the API provider. Operation 500 further identifies (502) a classification for the API user. In some implementations, a classification for the API user may be based on a profile, wherein an API user may provide information about the quantity of requests expected by the user, a user type (e.g., industry, use case, etc.), a location of the user, or some other information about the user. From the information supplied by the user, a sample rate may be determined for the user wherein the sample rate defines the frequency that an API request is identified to be supplied as part of the API request information. In some implementations, the API request information may include the full API request, however, the API request information may include extracted information from the request, such as the API function, a timestamp, a user identifier, or some other information. As an illustrative example, an API user that is in a first geographic location may require that no API requests be processed by the monitoring service, while another API user that is in the same industry may provide fifty percent of all API requests to the monitoring service.

In some examples, the sampling rate associated with an API user may be dynamic based on the classification for the user. In particular, monitoring service 130 may identify (503) a second sample rate based on the classification of the API user and obtain (504) second API request information associated with API requests from the API user to the API provider, wherein the API request information corresponds to the second sample rate of requests to the API provider. In some implementations, the user classification may be based on input provided from the user as part of the user profile. Additionally, monitoring service 130 may use information regarding the usage of the API provider to determine the classification of the user. The usage may include the quantity of requests to the API provider, the types of requests to the API provider, the length of time that the user has used the API provider, an error rate identified in the API requests provided by the user, or some other factor. As a result, the sampling rate may be modified in association with the user. For example, a first sampling rate may be used for new users of API provider 110, while a second sampling rate may be used for experienced users of API provider 110. In another example, monitoring service 110 may identify the frequency of errors in the API requests, the types of functions or sequence of functions in the API requests, or some other information from the API request information and update the classification for the user based on the information in the API request information. Once the classification is updated, the sampling rate may be updated to correspond to the classification for the user.

Figure 6:
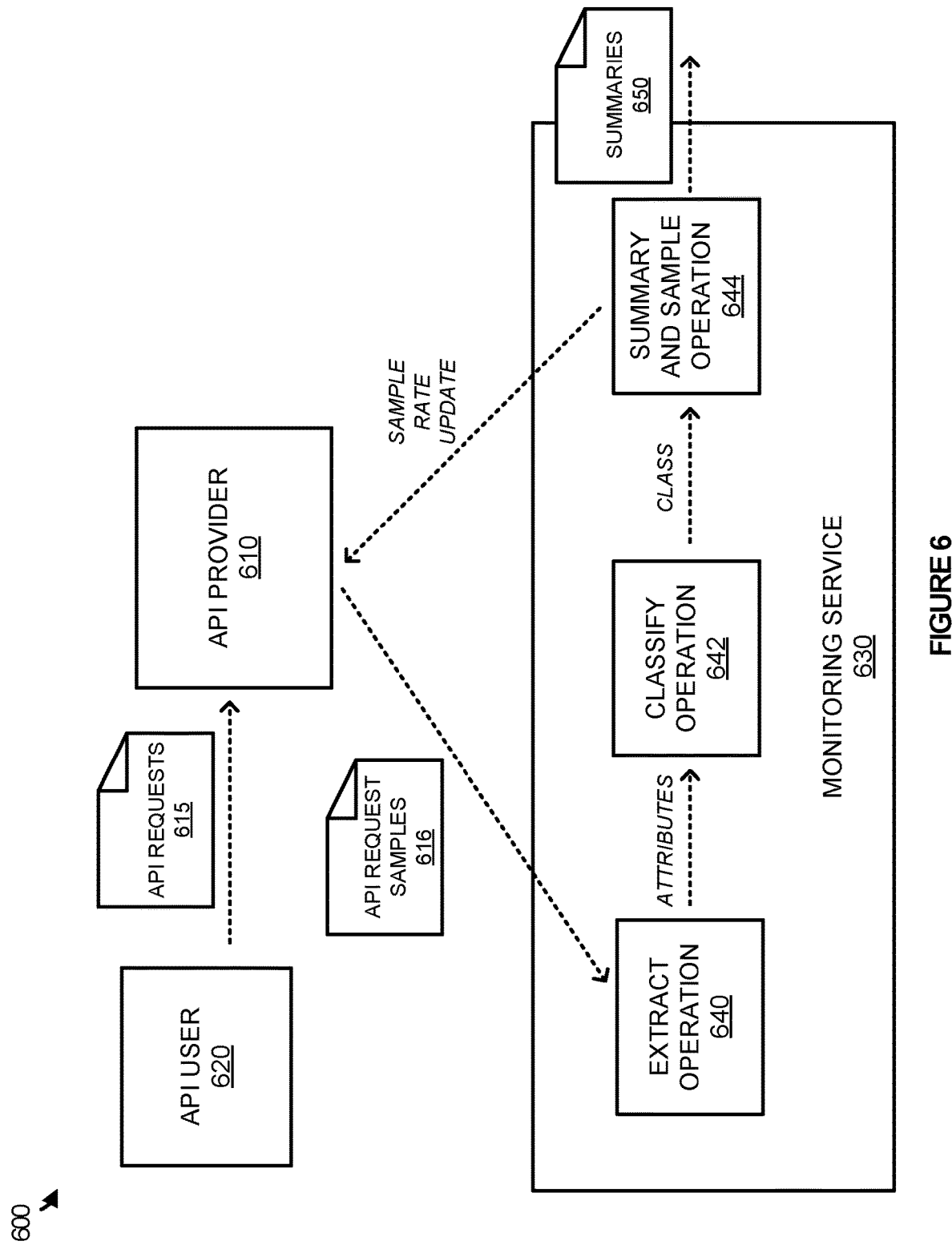
FIG. 6 illustrates an operational scenario of managing sampling rates associated with API users according to an implementation.

FIG. 6 illustrates an operational scenario 600 of managing sampling rates associated with API users according to an implementation. Operational scenario 600 includes API user 620, API provider 610, monitoring service 630, API requests 615, API request samples 616, and summaries 650. Monitoring service 630 provides extract operation 640, classify operation 642, and summary and sample operation 644.

As depicted, API user 620 generates API requests 615 to API provider 610, wherein the requests may be used to obtain data, post data, or provide some other operation using an API from API provider 610. As API requests are received by API provider 610, API request samples 616 are provided to monitoring service 630 at a first sample rate, which is used to provide statistical operations based on API requests 615. As depicted in operational scenario 600 monitoring service 630 may use extract operation 640 to extract attributes or information from API request samples 616, wherein the attributes may include an identifier for the API user associated with the requests, API function identifiers, timestamps, or some other information. As the information is extracted for API user 620, classify operation 642 may classify API user 620 based at least in part on the attributes or statistics derived from the attributes. In some implementations, the classification for a user may be based on user profile input and/or statistics derived from the attributes identified in the API sample requests. The statistics may include a total quantity of requests to the API provider, sequence trends in the API requests, a total time that the user has used API provider 610, a quantity of errors in the API requests from API user 620, or some other statistic. The user profile input may include information about the user, such as the use case for API provider 610, the industry associated with API user 620, or some other information about the user. Based on the classification, summary and sample operation 644 may update the sample rate for API request information and may generate summaries 650, which can be provided to a user and/or an administrator associated with API provider 610. For example, if a quantity of errors identified in requests from API user 620 met one or more criteria, then the sample rate may be updated or increased to retrieve additional information from the requests of the API user.

In some implementations, monitoring service 630 may further generate summaries 650 that can be provided to an administrator associated with API provider 610 or API user 620. The summaries may include a variety of different information including statistics derived from API request samples 616, such as the total number of requests, the total number of errors, frequently used sequences of API functions, or some other information. Additionally, when communicated to an API user, the information may include suggestions based on the statistics. The suggestions may indicate new features, sequence of functions used by other users, possible corrections to identified errors, or some other information used to suggest changes to the usage associated with the API. The summary information may be provided as an email, a text message, a pop-up notification, or as some other summary element. The summaries may be provided periodically, may be provided when the statistics satisfy one or more criteria, or may be provided at some other interval.

In some examples, in addition to or in place of changing the sample rate associated with users, monitoring service 630 may proactively change what requests are permitted to API provider 610. These permissions may include blocking a user from generating API requests to API provider 610, preventing specific types of requests to API provider 610, or providing some other operation based on the API statistics associated with requests from one or more API users. The API statistics that could trigger the blocking of API requests may include an API user exceeding an API usage threshold, non-payment by a user of the API provider, suspicious quantities or types of API function requests, or some other statistic or trend from one or more users. For example, monitoring service 630 may identify a sequence of functions from a user that differs from traditional functions executed by other users of API provider 610. Consequently, monitoring service 630 may pause or block future API requests from the user until the issue is resolved. Additionally, monitoring service 630 may provide a notification to the API user and/or an administrator of API provider 610 indicating the suspicious activity and permitting the administrator to block the API user or permit the requests.

Figure 7:
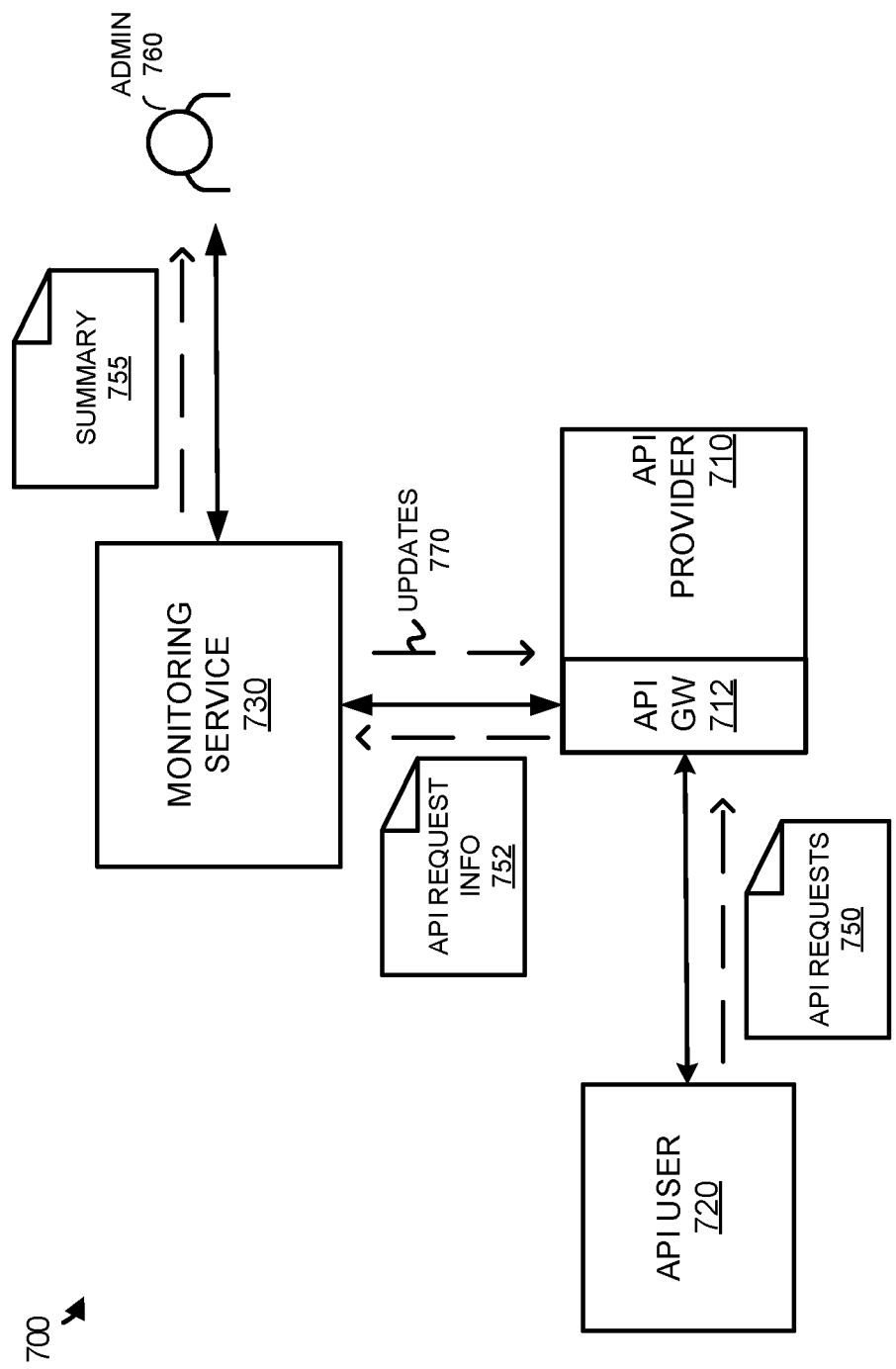
FIG. 7 illustrates a computing environment to manage API usage summaries and block API requests according to an implementation.

FIG. 7 illustrates a computing environment 700 to manage API usage summaries and block API requests according to an implementation. Computing environment 700 includes API user 720, API provider 710 with API gateway 712, monitoring service 730, administrator 760, API requests 750, API request information 752, updates 770, and summary 755.

In operation API user 720 generates API requests 750 that are received by API gateway 712, which routes the requests for processing by API provider 710. The API requests may be used as part of a service that allows users to obtain, post, or provide some other interaction with a database, or may be used to implement a mobile application on an end user device. As the requests are obtained, information for at least a subset of the requests is provided as API request information 752 to monitoring service 730. API request information 752 may be obtained using a plugin that monitors both the initial request from API user 720 and the response provided by API provider 710. Monitoring service 730 may identify statistical trends in the requests for API user 720 based on the API request information. The trends may include sequencing information for API functions, a quantity of requests for the API user, types of requests, frequency of requests, errors in the requests or response to requests, the amount of data provided in response to requests, or some other statistical information. In some implementations, to identify API user 720 from a group of API users, API provider 710 may use tokens or other identifiers that can be used to identify both the API user and the session associated with the user. An API user may be provided with multiple tokens, such as when multiple employees for a company (API user) are interacting with API provider 110. Each of the employees when creating a session may be provided with a unique token that is then associated with the company or API user profile. As an example, when API user 720 initiates a first request, API provider 710 may allocate API user 720 a token that is unique to API user 720. When requests are received with the token (or other identifying information provided by API provider 710), API provider 710 and/or monitoring service 730 may identify the API user associated with the request. In some examples, monitoring service 730 may use plugins in API gateway 712 to configure sample rates, blocking rules, or other configurations associated with the one or more API users for API provider 710. For example, API gateway 712 may be configured to sample every fifth API session for API user 720, wherein the session may be for a period of time, for a quantity or set types of API functions, or for some other interval.

Based on the statistical information monitoring service 770 may implement updates to API provider 710 and API gateway 712. The updates may include changing a sample rate for API request information associated with API user 720, blocking requests from API user 720, or providing some other update based on the statistical information satisfying one or more criteria. For example, API user 720 may initiate a large increase in API requests to API provider 710. As a result, monitoring service 730 may block future requests from the API user or may increase the sampling for API request information 752 to obtain additional information about the requests. In some implementations, updates 770 may be based on just the API request information associated with the user (and other related users), however, the updates may further be based on a profile for the user. The profile may indicate an industry associated with the user, a paid tier or amount of API requests permitted by the user, the length of time that the user has used API provider 710, or some other profile information. For example, updates 770 may be used to block or limit the quantity of API requests from a user once the requests exceed a threshold amount.

In some implementations, in addition to providing updates to the sampling and/or blocking one or more types of API requests from API user 720, monitoring service 730 may further generate summary 755 that can be supplied to administrator 760. Administrator 760 is representative of an administrator for API provider 710 or may be an administrator associated with API user 720. The information provided in summary 755 may comprise statistical information about the requests from API user 720, wherein the statistical information may include a total quantity of requests, information about the sequence of API functions used, information about errors in the API requests, or some other visual representation associated with API user 720 (or additional users in the example of an administrator for API provider 710). In some examples, summary 755 may further indicate suggestions to administrator 760, such as new features for API provider 710, common API sequences used by other API users, a change in classification (e.g., a higher or lower tier service provided by API provider 710), or some other suggestion. The suggestions may be based at least in part on API request information 752 received by monitoring service 730.

Although demonstrated in the example of FIG. 7 as using plugins for an API gateway service, it should be understood that that the API request information may be extracted directly from the services of the API provider. In this example, the API provider may use an SDK that is capable of identifying relevant API request information (initial requests and responses to the requests) and communicating the information to monitoring service 730. Additionally, the monitoring service may provide configuration updates that can be used to modify sample rates associated with one or more of the users, block users or specific types of requests, or provide some other modification to the configuration in obtaining API request information or blocking malicious API users and/or requests.

Figure 8:
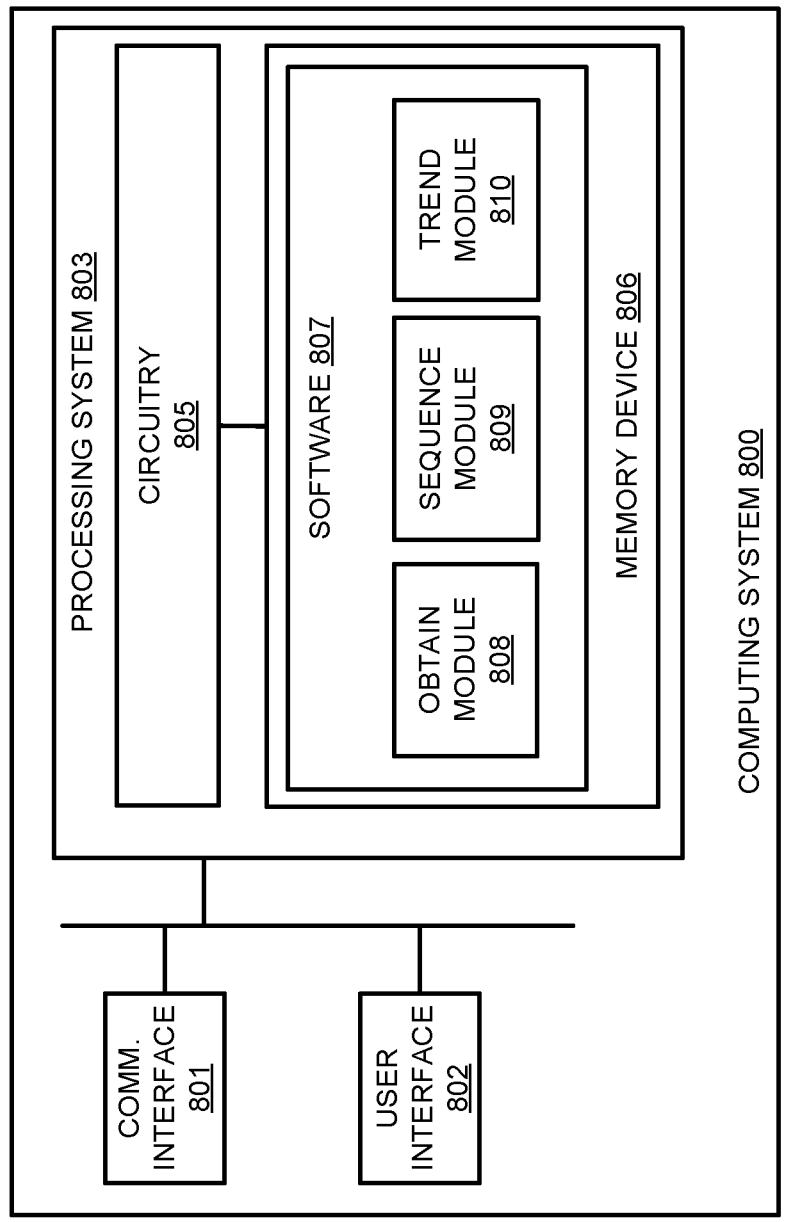
FIG. 8 illustrates a computing system to monitor and identify trends in API path usage according to an implementation

FIG. 8 illustrates a computing system 800 according to an implementation. Computing system 800 is representative of any computing system or systems with which the various operational architectures, processes, scenarios, and sequences disclosed herein for a management system may be implemented. Computing system 800 is an example monitoring service 130, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate with one or more computing systems that act as an API provider that receives API requests from API users. Communication interface 801 may further communicate with one or more console devices that correspond to administrators associated with the API provider. The console devices may comprise smartphones, tablets, computers, or some other console device.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples. In some examples, user interface 802 may be used to provide summaries to administrators associated with the API provider.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes obtain module 808, sequence module 809, and trend module 810, although any number of software modules may provide a similar operation. Operating software 807 may further include an operating system, utilities, drivers, network interfaces, applications, or some other type of software. When executed by processing circuitry 805, operating software 807 directs processing system 803 to operate computing system 800 as described herein.

In one implementation, obtain module 808 directs processing system 803 to obtain API request information associated with an API provider. The API request information may include at least header information associated with API request packets to the API provider, wherein the header information may identify an API user associated with the request, an API function associated with the request, a sequence identifier for multiple API requests, or some other information. As the API request information is obtained, sequence module 809 directs processing system 803 to identify sequences of the API requests using the API request information. For example, a first API request in a sequence to the API provider may be used to obtain data, while a second API request may be used to store data in data repository maintained by the API provider.

After the sequences are identified for the API requests, trend module 810 directs processing system 803 to identify one or more API path trends in the API requests based on the identified sequences. In some implementations, the API path trends may indicate a frequency or rate at which each of the API paths are used. In other implementations, the API path trends may be identified based on comparing the current sequences to previously identified sequences or predicted sequences. In comparing the sequences, trend module 810 may compare the rate at which a sequence was requested during a current period and compare the rate to a previous period or an expected rate for the period. If the rates differ by a threshold amount, then an API path trend may be identified for the sequence. In some examples, the rates for two or more API users may be combined, however, it should be understood that the statistics associated with each individual API user may be processed separately in some examples.

Once trends are identified, trend module 810 may generate summaries that can be used to provide a visual representation of the trends to one or more administrators. In some examples, the trends and/or the summaries may be generated based on requests from administrators, however, it should be understood that the trends and/or summary may be generated automatically by computing system 800. In at least one example, when a user provides a request for the summary, the user may provide preferences of interest for the summary, wherein the preferences may indicate API functions of interest, a period of interest, an API user of interest, or some other information. Once the request is identified, trend module 810 may identify data relevant to the request and generate a visual representation of the data. In some examples, the generation of the summary may include identifying API path trends that qualify based on the preferences provided by the administrator and generating a summary using the identified API trends. The summary may indicate a heatmap or list of API paths or sequences based on the usage rates of the various API functions, the summary may indicate one or more API functions that are identified as possible issues in the API, may identify trends in the API paths as a function of time, or may demonstrate some other information related to the API path trends.

In at least one implementation, the API path trend may identify possible issues in the API configuration, which may be based on large changes in the rate at which is path is used, a lack of usage of a particular API function, error codes provided in response to API requests, or some other API request information. When a possible issue is identified, the issue may be provided in a summary to an administrator, where the summary may indicate the path or sequence that causes the issue, any changes to the API configuration prior to the identification of the issue, or some other information related to the issue. For example, if computing system 800 determines that an API function is unreachable or has not been used during a period, computing system 800 may determine what changes were made with respect to the API configuration prior to the API function becoming unreachable. These changes may then be provided in the summary to the administrator to permit the administrator to respond to the possible issue in the API.

In some examples, trend module 810 may be used to provide updates to the API provider, wherein the updates may change the sample rate for API requests that are provided as part of the API request information or may be used to block requests from one or more of the API users. The modifications to the sample rates and blocking requests from the API users may be based on the API function sequences used by the API users, the total number of requests initiated by the users, or some other statistical information derived from the API request information. In some examples, the sample rate and blocking mechanisms may be based on a profile for the API user, wherein the profile may indicate an industry for the user, the quantity of requests expected from the user, a length of time the user has used the API provider, or some other information provided for the user. For example, a sample rate for a new user of the API provider may be higher than an experienced user of the API provider.

In some implementations, trend module 810 may provide trend information as a summary to the API users and/or an administrator for the API provider based on trends identified from the API request information. The summary may indicate sequences used by one or more of the API users, total quantities of requests from one or more API users, or some other information from the API request information. The summary may be generated periodically, when one or more trends are identified, or at some other interval. Further, the summary may provide suggestions on actions to be taken, such as encouraging the removal of unused API functions or changes to the configuration to encourage additional use of the API functions.

Returning to the elements of FIG. 1, API users 120-122, API provider 110, and monitoring service 130 may each comprise communication interfaces, network interfaces, processing systems, computer systems, microprocessors, storage systems, storage media, or some other processing devices or software systems and can be distributed among multiple devices. Examples of API users 120-122, API provider 110, and monitoring service 130 can include software such as an operating system, logs, databases, utilities, drivers, networking software, and other software stored on a computer-readable medium. API users 120-122, API provider 110, and monitoring service 130 may comprise, in some examples, one or more server computing systems, desktop computing systems, laptop computing systems, or any other computing system, including combinations thereof. Although demonstrated as separate from API provider 110, it should be understood that monitoring service 130 may execute on the same computing system or systems as API provider 110.

Communication between API users 120-122, API provider 110, and monitoring service 130 may use metal, glass, optical, air, space, or some other material as the transport media. Communication between API users 120-122, API provider 110, and monitoring service 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between API users 120-122, API provider 110, and monitoring service 130 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   obtaining application programming interface (API) request information associated with API requests to an API provider from a plurality of users during a first period, wherein the API request information comprises API function identifiers associated with the API requests;
   identifying sequences of API requests from the plurality of users based on the API request information;
   identifying a rate of use for a sequence in the sequences of API requests based on the API request information;
   obtaining second API request information associated with second API requests to the API provider from the plurality of users during a second period;
   identifying second sequences of API requests from the plurality of users based on the second API request information;
   identifying a second rate of use for the sequence in the second sequences;
   identifying an API path trend based on a difference between the first rate of use and the second rate of use satisfying one or more criteria; and
   generating a summary based on the identified API path trend.

2. The method of claim 1, wherein the API request information further indicates an API user of the plurality of API users associated with each of the API requests.

3. The method of claim 1, wherein the API request information comprises at least headers associated with the API requests.

4. The method of claim 1, wherein the API requests comprise a sample set of all API requests to the API provider during the first period, wherein the second API requests comprise a second sample set of all API requests to the API provider during the second period, wherein the first sample set and second sample set are selected at a first sample rate from all the API requests to the API provider.

5. The method of claim 1 further comprising updating the first sample rate to a second sample rate based on the identified API path trend.

6. The method of claim 1 further comprising communicating, for display, the summary to an administrator associated with the API provider.

7. The method of claim 1 further comprising blocking API requests from one or more API users of the plurality of API users based on the identified API path trend.

8. A computing apparatus comprising:
a storage system;
a processing system operatively coupled to the storage system; and
program instructions stored on the storage system that, when executed by the processing system, direct the computing apparatus to:
obtain application programming interface (API) request information associated with API requests to an API provider from a plurality of users, wherein the API request information comprises API function identifiers associated with the API requests;
identify sequences of API requests from the plurality of users based on the API request information;
identifying a rate of use for a sequence in the sequences of API requests based on the API request information;
obtain second API request information associated with second API requests to the API provider from the plurality of users during a second period;
identify second sequences of API requests from the plurality of users based on the second API request information;
identify a second rate of use for the sequence in the second sequences;
identify an API path trend based on a difference between the first rate of use and the second rate of use satisfying one or more criteria and
generate a summary based on the identified API path trend.

9. The computing apparatus of claim 8, wherein the API request information further indicates an API user of the plurality of API users associated with each of the API requests.

10. The computing apparatus of claim 8, wherein the API request information comprises at least headers associated with the API requests.

11. The computing apparatus of claim 8, wherein the API requests comprise a sample set of all API requests to the API provider during the first period, wherein the second API requests comprise a second sample set of all API requests to the API provider during the second period, wherein the first sample set and second sample set are selected at a first sample rate from all the API requests to the API provider.

12. The computing apparatus of claim 8, wherein program instructions further direct the computing apparatus to update the first sample rate to a second sample rate based on the identified API path trend.

13. The computing apparatus of claim 8, wherein the program instructions further direct the computing apparatus to communicate, for display, the summary to an administrator associated with the API provider.

14. The computing apparatus of claim 8, wherein the program instructions further direct the computing apparatus to block API requests from one or more API users of the plurality of API users based on the identified API path trend.

15. A method comprising:
obtaining application programming interface (API) request information associated with API requests to an API provider by an API user, wherein the API request information comprises at least API function identifiers associated with the API requests, and wherein the API requests are sampled at a first rate from a set of API requests from the API user;
identifying rates of use associated with sequences of API requests by the API user based on the API request information;
identifying one or more trends for the API user based on the rates of use, wherein identifying a first trend of the one or more trends comprises:
determining that a rate of use associated with a first sequence of the one or more sequences during a first period differs from a rate of use associated with the first sequence during a second period by a threshold amount; and
modifying the first rate to a second rate based on the one or more trends.

16. The method of claim 15 further comprising generating a summary of the one or more trends.

17. The method of claim 15 further comprising blocking at least a portion of API requests from the API user based on the one or more trends.

18. The method of claim 15, wherein the API request information comprises at least headers associated with the API requests.

* * * * *